United States Patent
Gruenwald et al.

(10) Patent No.: US 8,287,628 B2
(45) Date of Patent: Oct. 16, 2012

(54) FLUID RESERVOIR HAVING A GAS SENSOR AND A FILTER

(75) Inventors: Werner Gruenwald, Gerlingen (DE); Thorsten Allgeier, Untergruppenbach (DE); Kai Oertel, Stuttgart (DE); Ian Faye, Stuttgart (DE); Stephan Leuthner, Leonberg (DE); Jan-Michael Graehn, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 596 days.

(21) Appl. No.: 12/443,585

(22) PCT Filed: Aug. 2, 2007

(86) PCT No.: PCT/EP2007/058000
§ 371 (c)(1),
(2), (4) Date: Dec. 11, 2009

(87) PCT Pub. No.: WO2008/037534
PCT Pub. Date: Apr. 3, 2008

(65) Prior Publication Data
US 2010/0108542 A1    May 6, 2010

(30) Foreign Application Priority Data
Sep. 28, 2006   (DE) .................... 10 2006 045 920

(51) Int. Cl.
*F17C 11/00*    (2006.01)

(52) U.S. Cl. ............................................ 96/109; 96/111
(58) Field of Classification Search ............ 96/109–114; 206/0.7
See application file for complete search history.

(56) References Cited

U.S. PATENT DOCUMENTS

| | | | |
|---|---|---|---|
| 4,522,159 A | 6/1985 | Engel et al. | |
| 5,460,745 A * | 10/1995 | Lee | 252/182.32 |
| 5,980,608 A | 11/1999 | Dietz et al. | |
| 6,592,653 B2 * | 7/2003 | Wang et al. | 95/131 |
| 7,160,359 B2 * | 1/2007 | Vincent et al. | 95/90 |
| 7,323,043 B2 * | 1/2008 | Finamore | 96/146 |
| 8,057,584 B2 * | 11/2011 | Schubert et al. | 96/108 |
| 2001/0027724 A1 | 10/2001 | Oshima et al. | |
| 2003/0037551 A1 | 2/2003 | Wolfe | |
| 2003/0175563 A1 | 9/2003 | Bruck et al. | |

FOREIGN PATENT DOCUMENTS

| | | | |
|---|---|---|---|
| DE | 10110169 A1 | | 9/2001 |
| JP | 2002-54798 | * | 2/2002 |
| WO | 9934897 A1 | | 7/1999 |
| WO | 2006119428 A2 | | 11/2006 |

* cited by examiner

*Primary Examiner* — Frank Lawrence, Jr.
(74) *Attorney, Agent, or Firm* — Michael Best & Friedrich LLP

(57) ABSTRACT

An absorption fluid reservoir having a fluid inlet for receiving gases during a charging event and a gas analysis unit for detecting unwanted impurities in the gases prior to being received in the reservoir and a control unit for eliminating the gases having the impurities.

20 Claims, 1 Drawing Sheet

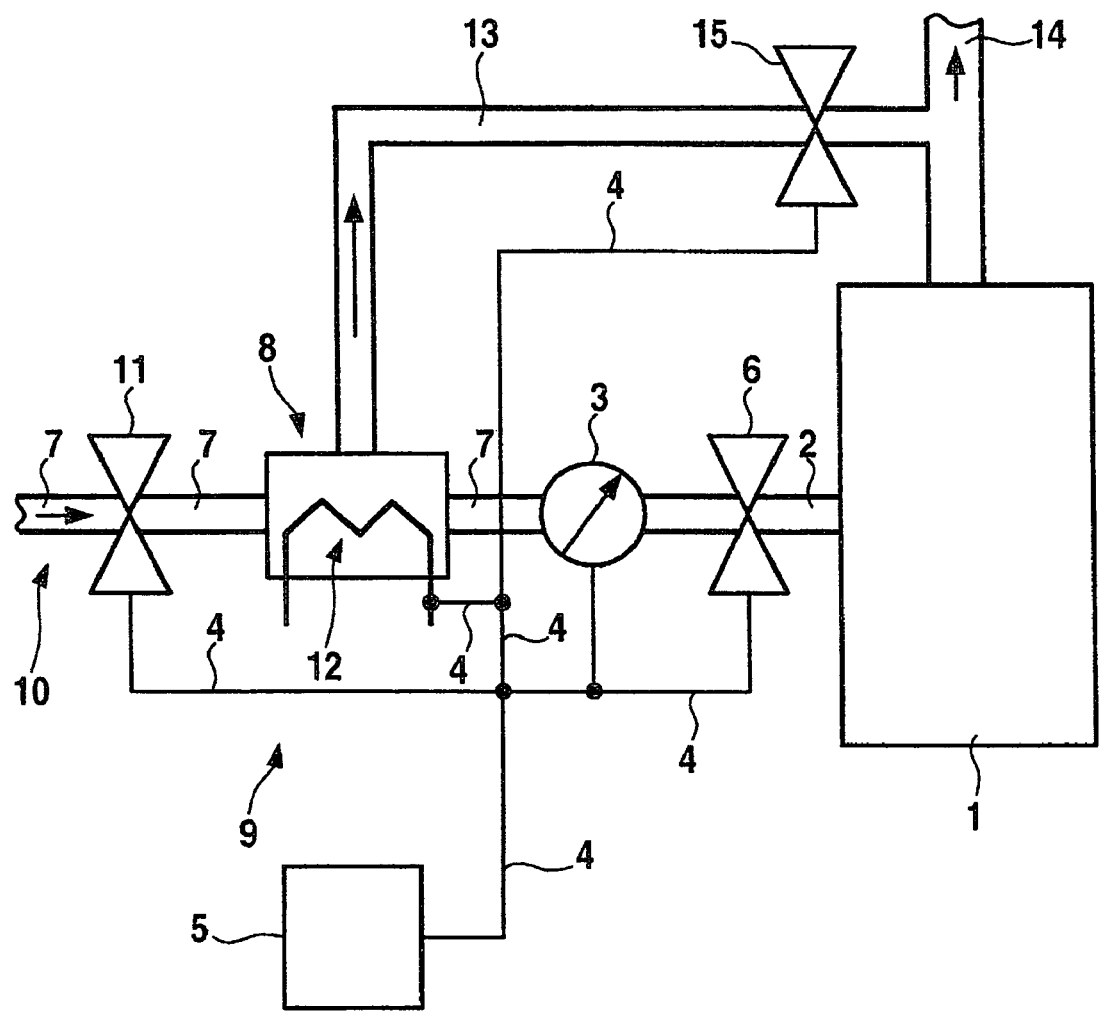

FLUID RESERVOIR HAVING A GAS SENSOR AND A FILTER

CROSS-REFERENCE TO RELATED APPLICATION

This application is a 35 USC 371 application of PCT/EP 2007/058000 filed on Aug. 2, 2007.

BACKGROUND OF THE INVENTION

1. Field of the Invention

The present invention relates to a fluid reservoir.

2. Description of the Prior Art

For the storage of fluids, in particular compressible fluids such as gases, the use of reservoirs is known. A first type of fluid reservoir is pressure tanks, for instance. These are relatively invulnerable to contaminants introduced with the fluid to be stored. Another kind of fluid reservoir, known as adsorption reservoirs, for instance for natural gas, hydrogen, or the like, are conversely highly vulnerable to the introduction of certain contaminants. In adsorption reservoirs, the gas to be stored is in fact adsorbed on materials having a large internal surface area, such as zeolites or MOFs, and is thereby stored. Contaminants in the reservoir, such as the introduction of water vapor or polymolecular hydrocarbons, have irreversible adsorption sites and as a result reduce the storage capacity of a thus-contaminated reservoir. Metal hydride reservoirs and MOFs suitable for storing hydrogen have similar problems.

OBJECT AND SUMMARY OF THE INVENTION

The object of the present invention is to improve a fluid reservoir of the type defined at the outset.

Accordingly, the present invention relates to a fluid reservoir, in particular an adsorption fluid reservoir, having a fluid inlet for receiving the fluid. This fluid reservoir is distinguished in that a gas analysis unit is provided. Thus the fluid delivered through the fluid inlet for storage can be monitored for contaminants, in particular contaminants that cause irreparable reservoir damage, such as water vapor and/or polymolecular hydrocarbons or the like.

By means of a control unit also associated with the fluid reservoir, a safety routine can be started if an applicable gaseous contaminant is detected. For instance, in a first embodiment, a first non-return valve disposed at the fluid inlet can be closed, to prevent the penetration of the contaminant detected.

If such an event occurs, the control unit can also issue a warning and/or control signal to correspondingly suitable devices. For instance, to signal this event, an optical and/or acoustical warning is conceivable. As a control signal, the activation of a shutoff signal for the assigned fluid delivery system is for instance possible. Both signals can optionally also be made available to a further control unit, for instance to a spigot system control that supplies the tank to be refueled, via suitable circuitry connections.

In a further advantageous embodiment, the fluid inlet can be preceded by a filter, which is preferably embodied for filtering out such unwanted fluid contaminants. Preferably, in such a construction, the gas analysis unit can be disposed downstream of the filter, in terms of the refueling direction of the fluid reservoir. Thus besides securing the fluid reservoir, functional monitoring of the filter is advantageously possible simultaneously.

To that end, the filter can be embodied for instance in the form of a cold trap and/or in the form of an activated charcoal filter, or the like. It may also include the same and/or a similar material as the adsorption reservoir. For maintaining or restoring the functional capability of the filter, the filter is preferably conceived of such that cleaning and/or regeneration is possible, especially preferably by means of an automated process.

By means of a second non-return valve, preferably disposed upstream of the filter, in cooperation with the first non-return valve, line-related insulation of the filter is possible. If both non-return valves close in this way, additional fluid cannot be delivered in the supply line, nor can fluid present in the filter between the two valves be carried onward in the direction of the fluid reservoir.

By means of a heater, which may be disposed for instance in or on the filter, it is possible to extract existing fluid contaminants in the line region located between the two non-return valves and including the filter and for instance carry them past the filter, via a bypass line originating in that region, to a fluid withdrawal line. This kind of filter or line segment cleaning process can for instance also be performed preventively, before, during and/or after a refueling operation.

By the diversion of the fluid components, expelled via the heater, to a fluid withdrawal line, these components can be delivered to a fluid processing process that is invulnerable to these contaminants, such as a combustion process in an energy conversion system. The metering of this quantity of gas can be effected via a metering valve, which is preferably provided in the bypass line.

BRIEF DESCRIPTION OF THE DRAWING

The invention will be described in further detail in conjunction with the drawing, in which:

FIG. 1 shows a schematic illustration of a fluid reservoir with supply and control components.

DESCRIPTION OF THE PREFERRED EMBODIMENT

Accordingly, the present invention, as shown in FIG. 1, pertains to a fluid reservoir 1, which can be filled with a fluid, preferably a gas, via a fluid inlet 2. For monitoring the delivered fluid for unwanted contaminants, such as water vapor, polymolecular hydrocarbons, or the like, which would irreversibly damage the adsorption fluid reservoir shown here, a gas analysis unit 3 is provided. It communicates via a signal line 4 with a control unit 5. If an unwanted fluid contaminant is detected, the control unit 5 causes a closure of a first non-return valve 6, disposed in the fluid supply line 7 upstream of the fluid inlet 2. It can thus be assured that no unwanted contaminants can penetrate into the adsorption fluid reservoir 1. To protect the fluid reservoir against the penetration of such contaminants, a filter 8 is connected upstream of the fluid inlet 2 in the fluid supply line 7. This filter may for instance be embodied in the form of a cold trap, an activated charcoal filter, and/or the like.

To enable disconnecting the portion 9 of the fluid supply line, in which the filter 8 is disposed, from a supply line side 10 as well, a second non-return valve 11 is provided. After the closure of the two valves 6 and 11, heating of the fluid located in this portion 9 can be brought about via a heater 12, so that this fluid, together with contaminants that may be present and/or accumulated in it, can be expelled or carried away via a bypass line 13 to a fluid withdrawal line 14. As a result, it is possible also for fluid components unsuitable for storage in the fluid reservoir to be delivered without loss to the intended implementation process, for instance to a suitably embodied energy conversion unit, such as a fuel cell, an internal combustion engine, or the like.

For metering this fluid supply into the fluid withdrawal line 14 as may be necessary or desired, a metering valve 15 is also shown as an example in the bypass line 13.

It is thus possible over the course of time of the gas withdrawal from the reservoir for the calorific value of the gas not to change, and thus for the power of an engine and its running performance, for instance, to remain constant. Overall, the present invention assures that on fueling of the fluid reservoir, no reduction in the storage capacity from unwanted contamination effects, such as the occupation of storage sites in an adsorption fluid reservoir by polymolecular hydrocarbons, water vapor, or the like, can occur.

The foregoing relates to the preferred exemplary embodiment of the invention, it being understood that other variants and embodiments thereof are possible within the spirit and scope of the invention, the latter being defined by the appended claims.

The invention claimed is:

1. An adsorption fluid reservoir having adsorption material therein and a fluid inlet conduit for receiving a gas from a gas source during a charging event and a gas analysis unit disposed in said inlet conduit for analyzing impurities in said received gas.

2. The fluid reservoir as defined by claim 1, wherein a control unit is provided for controlling the flow of said gas to said reservoir.

3. The fluid reservoir as defined by claim 1, wherein a first non-return valve is provided in said inlet conduit between said reservoir and said gas analyzer unit.

4. The fluid reservoir as defined by claim 2, wherein a first non-return valve is provided in said inlet conduit between said reservoir and said gas analyzer unit.

5. The fluid reservoir as defined by claim 1, wherein a filter is connected to said fluid inlet conduit upstream of said gas analyzer unit.

6. The fluid reservoir as defined by claim 2, wherein a filter is connected to said fluid inlet conduit upstream of said gas analyzer unit.

7. The fluid reservoir as defined by claim 3, wherein a filter is connected to said fluid inlet conduit upstream of said gas analyzer unit.

8. The fluid reservoir as defined by claim 5, wherein the filter is a cold trap.

9. The fluid reservoir as defined by claim 6, wherein the filter is a cold trap.

10. The fluid reservoir as defined by claim 7, wherein the filter is a cold trap.

11. The fluid reservoir as defined by claim 5, wherein the filter is an activated charcoal filter.

12. The fluid reservoir as defined by claim 6, wherein the filter is an activated charcoal filter.

13. The fluid reservoir as defined by claim 7, wherein the filter is an activated charcoal filter.

14. The fluid reservoir as defined by claim 5, wherein the filter includes the same and/or a similar material as the adsorption reservoir.

15. The fluid reservoir as defined by claim 6, wherein the filter includes the same and/or a similar material as the adsorption reservoir.

16. The fluid reservoir as defined by claim 7, wherein the filter includes the same and/or a similar material as the adsorption reservoir.

17. The fluid reservoir as defined by claim 5, wherein a second non-return valve is provided in said inlet conduit upstream of said filter.

18. The fluid reservoir as defined by claim 5, wherein said filter includes a heater.

19. The fluid reservoir as defined by claim 5, further including a bypass line from said filter to a fluid withdrawal line.

20. The fluid reservoir as defined by claim 19, wherein a metering valve is provided in said bypass line.

* * * * *